United States Patent Office 3,455,998
Patented July 15, 1969

3,455,998
VINYL ESTERS FROM ACETYLENE AND CARBOXYLIC ACIDS
Hans J. Arpe, Kohlkaul, Germany, assignor to Shell Oil Company, New York, N.Y., a corporation of Delaware
No Drawing. Filed Mar. 20, 1967, Ser. No. 624,215
Int. Cl. C07c 67/04, 67/00
U.S. Cl. 260—498                   10 Claims

ABSTRACT OF THE DISCLOSURE

Vinyl carboxylates are produced by liquid-phase reaction of a carboxylic acid with acetylene in the presence as catalyst of a zinc salt in combination with a metal-containing Lewis acid.

---

A process for the reaction of carboxylic acids with acetylene, in the liquid phase, in the presence of a carboxylic acid salt of zinc or cadmium is described in U.S. Patent No. 2,066,075, Reppe. Vinylation of carboxylic acids in vapor phase has also been disclosed heretofore, for example, in French Patent 1,262,416. In U.S. Patent 2,381,338, Cornthwaite-Scott, it is disclosed that pivalic acid could be vinylated only in the vapor phase since acetylene does not react with the acid in liquid phase. Execution of the vinylation reaction in liquid phase would offer decided advantages including, for example, improved control of operating conditions, such as temperature, and the attainment of higher reaction rates and improved selectivity with decrease in by-product production.

It has now been found that vinyl esters of carboxylic acids are obtained with substantially improved efficiency by reacting a carboxylic acid with acetylene, in the liquid phase, at a temperature of from about 200° to about 300° C., in the presence of a zinc salt of a carboxylic acid in combination with a metal-containing Lewis acid. The invention is applied with particular advantage to the vinylation of carboxylic acids having at least five carbon atoms to the molecule.

By the term "Lewis acid" as used in the present specification and attached claims is meant compounds which can accept an electron pair with the formation of a covalent bond (cf. for instance, Olah, Friedel-Crafts and Related Reactions, Intersc. Publ., 1963, volume I, page 173 ff.). According to the invention use is made of those Lewis acids which have a metal atom, boron included, as the central atom accepting the electron pair. In this context, therefore, boron is considered to be a metal. Examples of such suitable Lewis acids comprise the halides, preferably the middle halides, in particular the chlorides of the alkali metals, lithium, etc.; beryllium, zinc, palladium, boron, aluminum, gallium, didymium, cerium, iron, chromium, zirconium and uranium. A particularly desirable Lewis acid catalyst component comprises the halides, preferably chlorides of the rare earth metals, including, for example, the lanthanides, such as lanthanum, cerium, didymium, etc. As is known didymium normally consists of a mixture of rare earths such as lanthanum, cerium, praseodymium, neodymium and generally also minor amounts of samarium, gadolinium, ytterbium, etc. In the case of iron, aluminum or didymium the sulfates or phosphates may also be used instead of the halides. Particularly good results are obtained with aluminum chloride and didymium chloride ($DiCl_3$), and these are generally the preferred Lewis acids used.

It was observed that the use of Lewis acid cocatalysts containing water of crystallization such as $DiCl_3 \cdot 6H_2O$ and $AlCl_3 \cdot 6H_2O$ has distinct advantages, as seen by comparing Examples 8 and 9 below. Similar advantages are obtained by introducing small amounts of water continuously or intermittently into the reaction mixture, e.g., in the form of an acetylene stream loaded with water vapor.

As the zinc salt component of the combination catalyst, use is preferably made of a zinc salt of the same carboxylic acid as that to be vinylated. However, use may be made of salts of other acids than of the acid to be vinylated. However, in the latter case, the anion of the acid is generally slowly exchanged for the anion of the acid being vinylated. These salts can readily be prepared by reacting, e.g., zinc oxide, zinc hydroxide or zinc carbonate with the acid in a manner known per se. The salt can either be prepared beforehand or allowed to form in the reaction mixture itself.

The liquid phase in which the vinylation is to be carried out can be formed by the melt of the zinc carboxylate itself. It is, however, advantageous to use a high-boiling solvent, i.e. a solvent boiling above 250° C., preferably above 300° C., in which the zinc salt and the cocatalyst are dissolved. In the absence of the Lewis acid cocatalyst, the zinc salt is frequently insoluble in the solvent. Likewise, the cocatalyst is often insoluble in the absence of the zinc salt. In general, use is made of catalyst concentrations between about 0.5% and about 20%, in particular between about 5% and about 15% by weight of zinc salt component, based on the solvent. The Lewis acid cocatalyst concentration is suitably between about 5% and about 150%, preferably between about 10% and about 80 mol percent, based on the zinc carboxylate.

The solvent should, if possible, be inert under the reaction conditions. Suitable for this purpose are, for instance, organic solvents including hydrocarbons such as the paraffins and cycloparaffins having at least 16 carbon atoms. Advantageous hydrocarbons were found to be petroleum fractions boiling above about 300° C., such as desulfurized gas oil fractions, spindle oils, medicinal oils such as "Shell Ondina" 33, i.e., a mixed paraffinic/naphthenic oil having a boiling range of 400° C. to 470° C. Other suitable solvents are the anhydrides of α- or β-branched carboxylic acids which are difficult to hydrolyze and have a sufficiently high boiling point, glycols such as polyethylene glycol and polypropylene glycol, polyphenyl ethers, chlorinated polyphenyls, etc.

It was also found that with the use of high-boiling ester oils the life of the catalyst solution can be lengthened considerably. Suitable esters include for example dilauryl sebacic acid ester, laurylpivalic acid ester, and the like. Very good results were obtained with esters of geminal polymethanol compounds such as trimethylol propane esters of α-branched carboxylic acids, in particular with the ester from 1,1-dimethylol cyclohexane and the Koch acid of diisobutylene.

The catalyst solution comprising zinc salt, Lewis acid and solvent, is preferably preactivated by heating, for example from about 30 minutes to about 2 hours, together with the reaction components at temperatures between about 250° and about 300° C.

Acids which are vinylated according to the invention comprise the monocarboxylic and dicarboxylic alkanoic acids, such as for example acetic acid, propionic acid, isobutyric acid, pivalic acid, palmitic acid, stearic acid, benzoic acid, isophthalic acid, and the like. The invention is particularly suitable for the vinylation of monocarboxylic alkanoic acids, having at least 5 carbon atoms, preferably those having a tertiary or quaternary carbon atom in the α-position with respect to the carboxyl group. Acids of this type, generally termed "Koch acids" may be obtained from any suitable source, for example, by reaction of olefins such as isobutylene, diisobutylene, cracked olefins having 6 to 8 or 8 to 10 or 12 to 14 carbon atoms, propylene trimer, propylene tetramer and the like, with CO and H₂O in the presence of an acid catalyst, as described and claimed in U.S. Patents 2,913,489, De Benedictis et al.; 3,059,004, Waak et al. The invention is particularly advantageous for the vinylation of Koch acids having 5 to 9 carbon atoms, which acids can be vinylated by methods known heretofore only with difficulty or not at all in the liquid phase.

The vinyl esters obtainable from these α- or β-branched carboxylic acids can be polymerized or copolymerized with other ethylenically unsaturated compounds. The resultant (co)polymers are characterized by good chemical stability. They may be used, inter alia, in emulsion paints, as thickeners, emulsifiers, dispersants, as components in alkyd and epoxy resins and as viscosity improvers in lubricating oils.

It is preferred to use atmospheric pressure during the vinylation. When special provisions are being made to reduce the danger of explosion, higher pressures, or if desired lower pressures, may also be used. The molar ratio between acetylene nad carboxylic acid is generally between about 1:1 and about 30:1, preferably between about 2:1 and about 10:1.

The reaction temperature employed is between about 200° and about 300° C., preferably between about 225° and about 290° C. At lower temperatures there is a danger of the catalyst complex precipitating, and the reaction falling off.

The space velocity at which the acid is passed through the liquid phase is generally between about 20 and about 300, preferably between about 50 and about 200 g. of acid per kg. of the liquid phase per hour. Under the given reaction conditions the concentration of the acid in the liquid phase is only slight, for example below about 5% by weight, normally even below about 3 to about 1% by weight.

The vinyl ester and any unreacted acid evaporate from the liquid phase and can be withdrawn from the reaction vessel and subsequently condensed. It is advisable in this phase of the operation to use an inert gas stream, e.g., nitrogen, introduced above the liquid phase. It is preferred to carry out the vinylation according to the invention in the absence of any substantial amount of oxygen.

The continuous or intermittent addition of minor amounts of hydrochloric acid during the vinylation according to the invention was found to be advantageous in that it lengthens the life of the catalyst. About 0.5 to about 20 mols of HCl per mol of catalyst present in the mixture are preferably added continuously to the reaction.

Under given circumstances the life of the catalyst can be extended even further by adding additional minor amounts of Lewis acid cocatalyst during the reaction, for example from about 5 to about 20 mol percent, based on the zinc carboxylate.

The reaction according to the invention is particularly suitable for the vinylation of carboxylic acids in continuous operation. it is, however, also possible, if desired, to carry out the reaction batchwise.

EXAMPLES

A Pyrex glass reaction vessel was heated electrically. The reaction components—pivalic acid, acetylene, etc.—were introduced into the reaction mixture through the shaft of the vibromixer. The pressure in the reaction vessel was about 1.1 atm. The gases introduced were previously washed free of oxygen in an alkaline pyrogallol solution and subsequently dried. A nitrogen stream was continuously passed over the reaction mixture in order to remove the reaction product and any unreacted acid. These were collected in cooling traps (0° and −60° C.), and the compositions of the condensate and waste gases were determined by gas-chromatography. The condensate consisted mainly of pivalic acid and vinyl pivalate. The ester was separated by distillation: boiling point 112° C. (760 mm. Hg), $n_D^{20}$ 1.4058. It was stabilized with 0.1% by weight of hydrochinone.

The liquid catalyst phase was prepared in 100 ml. of "Shell Ondina" 33, a high-boiling paraffinic and cycloparaffinic hydrocarbon mixture, zinc pivalate and the Lewis acid cocatalyst being added at the same time. The mixture was heated at 250° C. for 15 minutes. Any water of hydration present was removed by passing nitrogen over the mixture. The catalyst solution was activated by passing reaction components (pivalic acid, acetylene) through the solution for one hour at 270° C. The mixture was then brought to the desired reaction temperature. Zinc pivalate was prepared from zinc hydroxide and a 50% excess of pivalic acid in ethanol. On cooling, the zinc pivalate crystallized out.

The catalyst solution used in following Examples 1 to 10 contained 14.35% by weight of zinc pivalate in "Shell Ondina" 33, and 10 mol percent (based on the zinc pivalate) of cocatalyst. Space velocity: 72 g. of pivalic acid per kg. of catalyst solution per hour. Molar ratio of acetylene to pivalic acid: 3.79. The results obtained are recorded in Table I.

TABLE I

| Example | Co-catalyst | Temp., °C. | Acetylene conversion,[1] mol percent | Yield of vinyl pivalate,[2] mol percent |
|---|---|---|---|---|
| 1 | LiCl | 280 | 93 | 51 |
| 2 | ZnCl₂ | 280 | 46 | 46 |
| 3 | ZnCl₂ | 260 | 54 | 52 |
| 4 | PdCl₂ | 280 | 139 | 86 |
| 5 | PdCl₂ | 260 | 82 | 53 |
| 6 | CrCl₃ | 280 | 70 | 56 |
| 7 | FeCl₃ | 280 | 121 | 76 |
| 8 | AlCl₃ | 260 | 79 | 70 |
| 9 | AlCl₃·6H₂O | 260 | 100 | 90 |
| 10 | DiCl₃·6H₂O | 260 | 106 | 73 |

[1] Based on the amount of pivalic acid introduced. When the conversion exceeded 100%, some polyacetylene was probably formed.
[2] Based on the pivalic acid introduced.

Comparative tests showed that:

(a) In the absence of zinc pivalate neither LiCl nor ZnCl₂ showed any vinylation activity below 300° C.;

(b) Although about 10% of zinc pivalate can be dissolved in Ondina oil, the zinc pivalate largely precipitates after addition of pivalic acid and is accordingly no longer catalytically active. In general, without a cocatalyst zinc pivalate has only very slight activity as a catalyst for the vinylation of pivalic acid;

(c) Neither didymium pivalate nor lithium pivalate are catalytically active as such.

In further tests with LiCl as cocatalyst the above reaction conditions were varied as shown in Table II.

TABLE II

| Example | Zinc pivalate, percent by weight | LiCl, mol percent | Space velocity, g./kg./hr. | Molar ratio, C₂H₂/pivalic acid | Temp., °C. | Conversion C₂H₂, mol percent | Yield of vinyl pivalate, mol percent |
|---|---|---|---|---|---|---|---|
| 11 | 10.25 | 125 | 68 | 3.3 | 300 | 99 | 57.4 |
| 12 | 10.25 | 125 | 66 | 3.2 | 280 | 88 | 67.0 |
| 13 | 10.25 | 125 | 62 | 3.3 | 265 | 49 | 38.0 |
| 14 | 14.35 | 126 | 65 | 3.2 | 265/270 | 56 | 49.3 |
| 15 | 14.35 | 54.6 | 52 | 5.2 | 280 | 121 | 55.7 |
| 16 | 14.35 | 32.8 | 55 | 4.9 | 280 | 118 | 55.5 |
| 17 | 14.35 | 10.9 | 53 | 5.1 | 280 | 75 | 48.0 |
| 18 | 14.35 | 10.0 | 72 | 3.8 | 280 | 93 | 51.4 |
| 19 | 14.35 | 4.2 | 68 | 4.0 | 280 | 48 | 36.0 |

In further tests with $DiCl_3$ as cocatalyst, the above reaction conditions were likewise varied. A space velocity of 70 g. of pivalic acid per kg. of catalyst solution per hour and a molar ratio of acetylene to pivalic acid of 3.8 were used. The results are shown in Table III.

TABLE III

| Example | Zinc pivalate, percent by weight in "Ondina" | $DiCl_3.7.5$ $H_2O$, mol percent | Temp., ° C. | Pivalic acid conversion, mol percent | Selectivity, mol percent, based on vinyl pivalate |
|---|---|---|---|---|---|
| 20 | 14.35 | 10 | 250 | 54.7 | 98 |
| 21 | 14.35 | 20 | 250 | 66.9 | 97.4 |
| 22 | 14.35 | 30 | 250 | 71.9 | 96.8 |
| 23 | 7.18 | 10 | 240 | 40.7 | 99 |
| 24 | 7.18 | 20 | 240 | 51.3 | 98.9 |
| 25 | 7.26 | 18.7 | 230 | 26.7 | 100 |
| 26 | 7.26 | 27.9 | 230 | 43.3 | 98 |
| 27 | 7.26 | 37.3 | 230 | 27.7 | 88.3 |
| 28 | 7.26 | 46.6 | 230 | 20.7 | 73.2 |

When $CeCl_3 \cdot aq.$ was used instead of $DiCl_3$ under the same conditions as in Example 26, a yield of 43.7 mol percent of pivalic acid was obtained with a selectivity with respect to vinyl pivalate of 99.5 mol percent (Example 29).

In order to establish the optimum space velocity, 6 l. per hour of acetylene and varying amounts of pivalic acid were passed at 230° C. through 100 ml. of "Ondina" oil containing 7.26% by weight of zinc pivalate (based on "Ondina") and 27.9 mol percent of $DiCl_3$ (based on zinc pivalate). The results can be seen from Table IV.

ing 7.26% by weight of zinc pivalate and 30 gramatomic percent (based on zinc pivalate) of a didymium salt. The results can be seen from Table V.

TABLE V

| Example | Co-catalyst | Temp., ° C. | Pivalic acid conversion, mol percent | Selectivity (vinyl pivalate), mol percent |
|---|---|---|---|---|
| 34 | $Di_2(SO_4)_3$ | 270 | 23 | 100 |
| 35 | $DiPO_4$ | 270 | 13 | 100 |

The life of the catalyst solution can be lengthened by adding hydrochloric acid during the reaction, as can be seen from the following examples. Reaction conditions: 7.26% by weight of zinc pivalate and 30 mol percent of $DiCl_3$ (based on zinc pivalate) in 100 ml. of "Ondina" oil; 6 l. of acetylene per hour; reaction temperature 250° C.; selectivity more than 95 mol percent. Hydrogen chloride gas was added continuously, as shown in Table VI.

TABLE VI

| Example | Space velocity, g./kg. of catalyst solution/hour | | Life of the catalyst,[1] hours | Vinyl pivalate yields | | Total, g. |
| | Pivalic acid | HCl | | Average, mol percent | Maximum, mol percent | |
|---|---|---|---|---|---|---|
| 36 | 67 | | 22.5 | 60.5 | 70 | 108 |
| 37 | 87 | 0.02 | 34.0 | 56.8 | 64.4 | 191 |
| 38 | 77 | 0.05 | 48.5 | 57.6 | 74.0 | 256 |
| 39 | 69 | 0.11 | 46.5 | 63.0 | 76.4 | 240 |
| 40 | 76 | 0.21 | 40.5 | 54.0 | 70 | 210 |

[1] The life of the catalyst solution is defined as the time in which the yield of vinyl pivalate falls to a value of 25 mol percent.

The use of high-boiling esters as solvents has likewise a favorable influence on the life of the catalyst solution and the total yield of vinyl pivalate. This can be seen from the following examples in which use was made of the same reaction conditions as in Examples 36–40. HCl was continuously introduced in an amount of 0.05 g./kg. of catalyst solution/hour. Ester A was obtained by esterification of the hydroxy pivalac acid on the one hand with lauryl alcohol, on the other with "Versatic" 9 acid, the Koch acid from diisobutylene. Ester B consisted of lauryl pivalate, ester C was a diester from 1,1-cyclohexanedimethanol and "Versatic" 9 acid. The results can be seen from Table VII.

TABLE VII

| Example | Solvent | Space velocity, g. of pivalic acid/kg. of catalyst solution/hour | Length of reaction, hours | Yield of vinyl pivalate | |
| | | | | Average, mol percent | Total, g |
|---|---|---|---|---|---|
| 41 | Cetane | 87 | 27 | 49.3 | 148 |
| 42 | Ester A | 95 | 52 | 60.7 | 342 |
| 43 | Ester B | 84 | 70 | 56.0 | 388 |
| 44 | Ester C | 76 | 155.5 | 54.8 | 762 |
| 44a | Glycerol tripivalic acid ester. | 88 | 41 | 51.6 | 220 |

TABLE IV

| Example | Space velocity, g. of pivalic acid/kg. of catalyst solution/hour | Pivalic acid conversion, mol percent | Selectivity (vinyl pivalate), mol percent | Productivity g. of vinyl pivalate/kg. of catalyst solution/hour |
|---|---|---|---|---|
| 30 | 34 | 67.1 | 99 | 28.4 |
| 31 | 68 | 43.3 | 98 | 36.2 |
| 32 | 105 | 27.3 | 100 | 35.9 |
| 33 | 171 | 11.7 | 99 | 24.9 |

The following tests show that the cocatalytic activity is not limited to halides. In these tests acetylene (6 l./hr.) and pivalic acid (70–80 g./kg. of catalyst solution/hr.) were passed through 100 ml. of "Ondina" oil, contain- Whereas the preceding examples related to the vinylation of pivalic acid, the following examples show that the present invention can also be used advantageously in vinylating other acids. In these tests, 80–100 g. of "Versatic" 9 acid/kg. of catalyst solution/hour were vinylated with 6 l. acetylene/hour at 250° C. in a manner similar to that of the preceding examples. The catalyst solution consisted of 100 ml. of "Ondina" 33 oil, containing 8.85 g. of the zinc salt of the "Versatic" 9 acid and various cocatalysts (see Table VIII). "Versatic" 9 acid is a Koch acid from diisobutylene.

TABLE VIII

| Example | Cocatalyst | Mol percent | Length of reaction, hours | Ultimate vinyl ester yield, mol percent |
|---|---|---|---|---|
| 45 | FeCl$_3$ | 30 | 10 | 86 |
| 46 | FeCl$_3$ | 30 | 20.5 | 88 |
| 48 | ZnCl$_2$ | 30 | 10 | 83 |
| 49 | DiCl$_3$·aq | 15 | 10 | 69 |
| 50 | DiCl$_3$·aq | 30 | 10 | 63 |
| 51 | LiCl | 30 | 10 | 63 |
| 52 | Di$_2$(SO$_4$)$_3$ | 30 | 10 | 52 |
|  |  |  | 10 | 21 |
|  |  |  | 26.5 | 21 |

I claim as my invention:

1. In the process for the production of vinyl esters of carboxylic acids wherein a carboxylic acid is reacted with acetylene, in liquid phase, in the presence of a catalyst, the improvement consisting essentially of effecting said reaction at a temperature of from about 200° to about 300° C. and using as the catalyst a zinc salt of a carboxylic acid in combination with a halide of a member of the group consisting of the alkali metals, the rare earth metals, zinc, palladium, iron and aluminum.

2. The process in accordance with claim 1 wherein said carboxylic acid is a monocarboxylic acid having at least five carbon atoms to the molecule.

3. The process in accordance with claim 1 wherein said carboxylic acid has a tertiary or quaternary carbon atom in alpha position with respect to the carboxyl group.

4. The process in accordance with claim 1 wherein said reaction is executed in the presence of an organic solvent having a boiling temperature above about 300° C.

5. The process in accordance with claim 4 wherein said solvent is an ester of a geminal polymethanol and an alpha-branched carboxylic acid.

6. The process in accordance with claim 1 wherein hydrochloric acid is added during the course of the reaction.

7. The process in accordance with claim 1 wherein said halide is aluminum chloride.

8. The process in accordance with claim 1 wherein said halide is a rare earth metal chloride.

9. The process in accordance with claim 8 wherein said rare earth metal chloride is the chloride of a lanthanide.

10. The process in accordance with claim 9 wherein said chloride of a lanthanide is didymium chloride.

References Cited

UNITED STATES PATENTS

| | | | |
|---|---|---|---|
| 1,786,647 | 12/1930 | Dykstra et al. | 260—498 |
| 2,066,075 | 12/1936 | Reppe | 260—498 |
| 2,310,780 | 2/1943 | Hanford et al. | 260—498 |
| 2,376,964 | 5/1945 | Groth et al. | 260—498 |

LORRAINE A. WEINBERGER, Primary Examiner

V. GARNER, Assistant Examiner

U.S. Cl. X.R.

260—410.9, 475, 476, 485